(12) United States Patent
Yu

(10) Patent No.: US 8,729,746 B2
(45) Date of Patent: May 20, 2014

(54) LINEAR VIBRATION DEVICE

(75) Inventor: Jin Han Yu, Chungcheongnam-do (KR)

(73) Assignee: Young Jin Hi-Tech Co., Ltd., Gumi-Shi, Gyeongsangbuk-Do ( * ) Notice: Subject to any disclaimer, the term of this patent is extended or adjusted under 35 U.S.C. 154(b) by 70 days.

(21) Appl. No.: 13/298,031

(22) Filed: Nov. 16, 2011

(65) Prior Publication Data
US 2013/0119787 A1    May 16, 2013

(51) Int. Cl.
*H02K 33/00* (2006.01)

(52) U.S. Cl.
USPC .............................. 310/25; 310/15

(58) Field of Classification Search
USPC .................. 310/25, 15, 36; 335/296; 381/396
See application file for complete search history.

(56) References Cited

U.S. PATENT DOCUMENTS 8,106,546 B2 *   1/2012   Yamazaki et al. ............... 310/29
8,130,086 B2 *   3/2012   Choi et al. ................. 340/407.1

* cited by examiner

*Primary Examiner* — Hanh Nguyen
(74) *Attorney, Agent, or Firm* — Lowe Hauptman & Ham, LLP

(57) ABSTRACT

The present invention provides a linear vibration device in which a PCB is coupled to a bracket having an extension piece protruding at a peripheral portion thereof to transfer an external electrical signal to a coil and a yoke of a stator is installed on an upper surface of the PCB to be coupled to the coil, in order to maximally generate an electromagnetic force in one direction. In addition, an upper plate and a lower plate are configured to concentrate a magnetic field of a magnet configured to create a magnetic field corresponding to an electromagnetic force of the yoke formed by the coil to one direction. Accordingly, a vibrating body includes a vibrator which is operated upward and downward in response to an electromagnetic force concentrated by the yoke, increasing vibration feelings due to the upward and downward movement thereof.

9 Claims, 9 Drawing Sheets

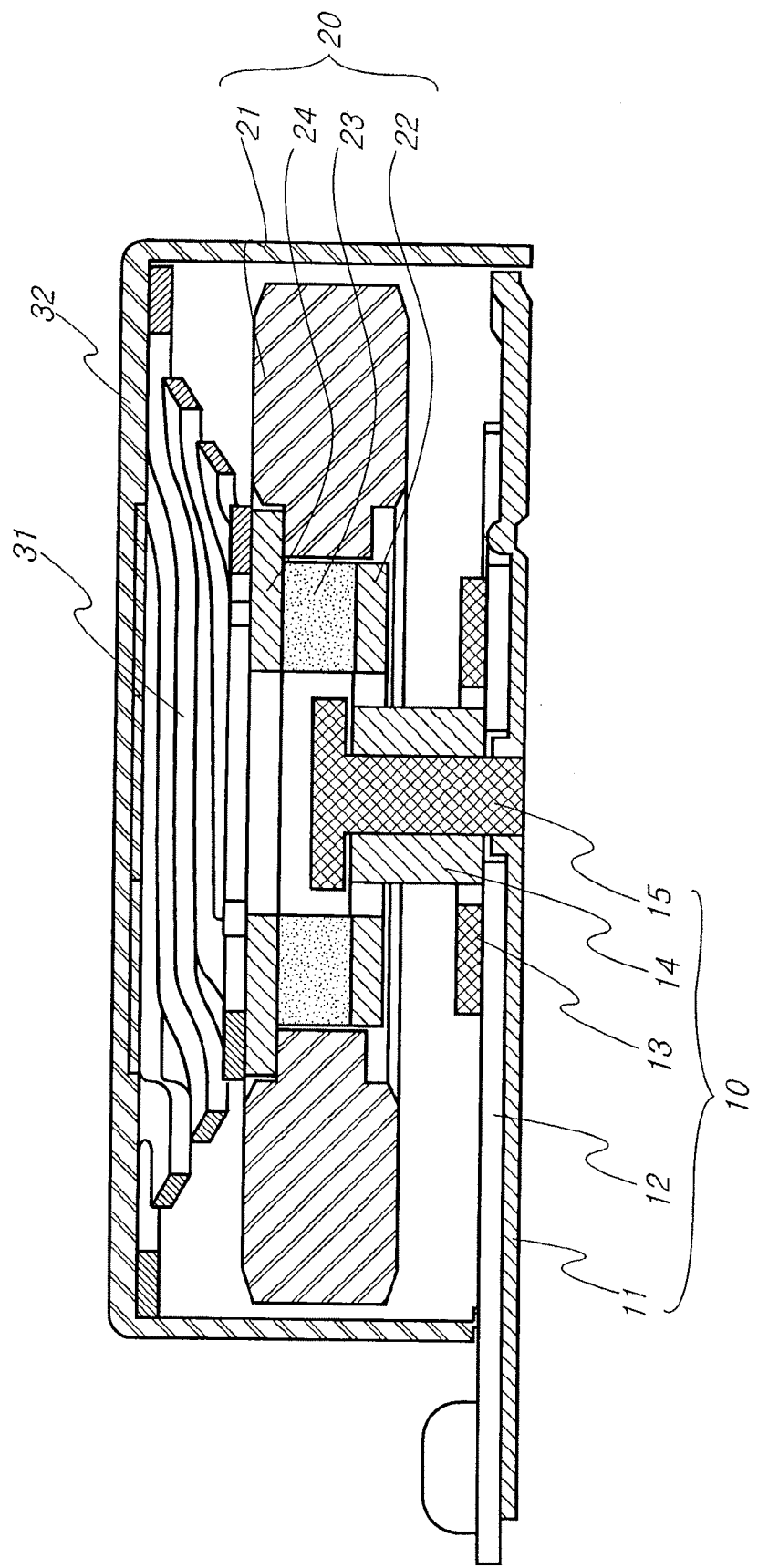

Fig. 3 --Prior Art--
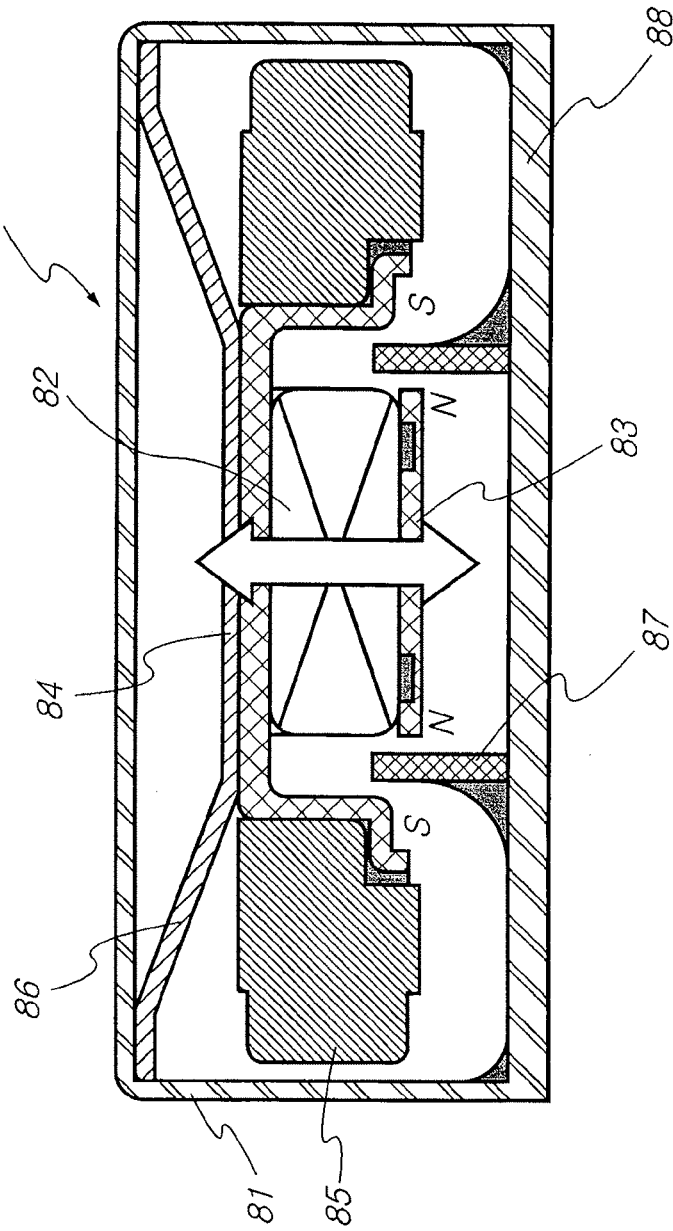
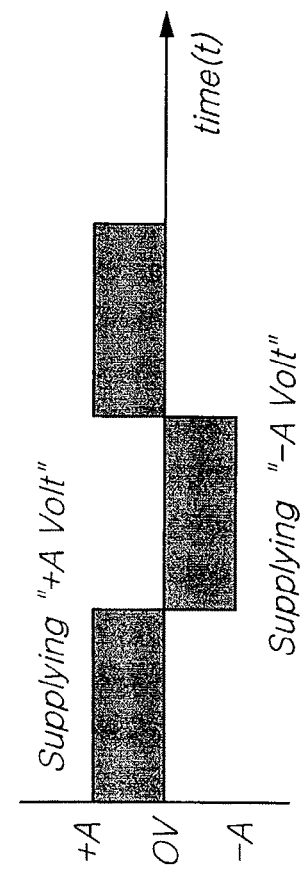

Fig. 8
--Prior Art--
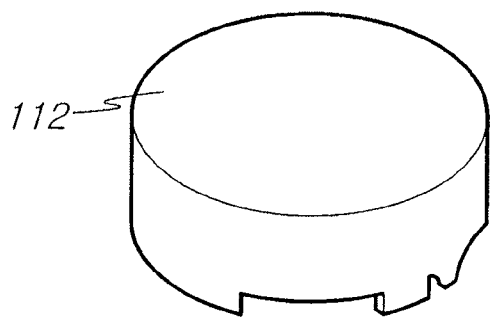
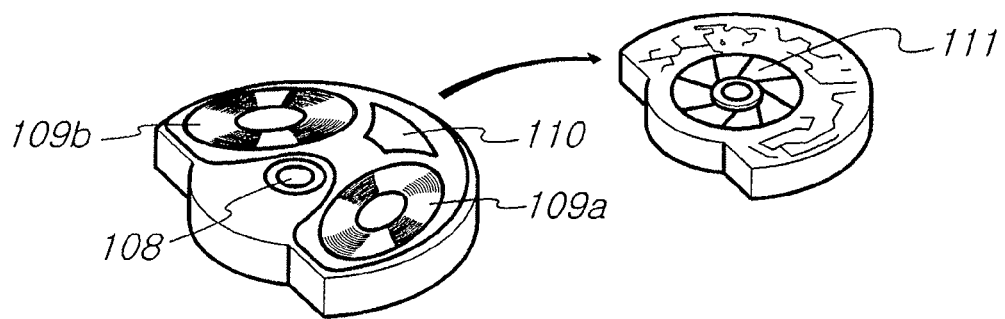
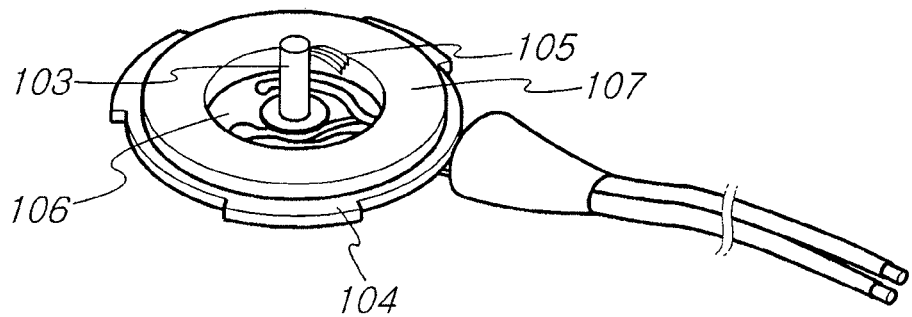

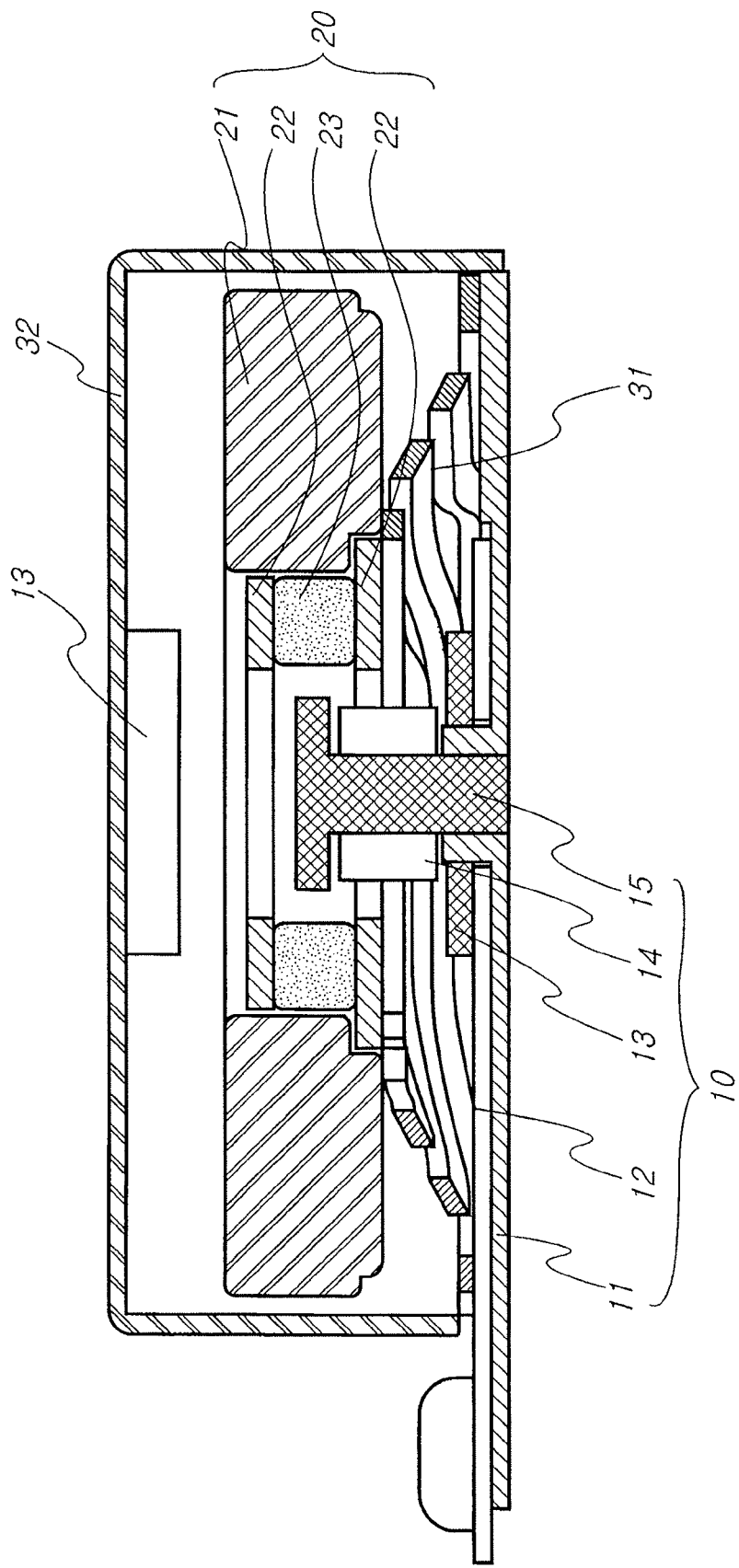

LINEAR VIBRATION DEVICE

BACKGROUND OF THE INVENTION

1. Field of the Invention

The present invention relates to a linear vibration device, and more particularly to a linear vibration device adapted to generate vibrations in electronic devices such as a mobile phone when a vibrating body having a weight body is moved upward and downward according to an input electrical signal with a specific frequency, while varying vibrations.

2. Description of the Prior Art

In general, mobile phones widely use bells or melodies to inform of the termination of calls, but the noise generated due to the bells or melodies may disturb other persons around the user of the mobile phone. In order to solve this problem, vibration motors are designed to inform the termination of calls not with a sound but with vibrations. In such a vibration motor, a vibrating body is generally mounted to a typical DC motor employing a brush. However, the brush limits a lift of the vibration motor, and fixes a limit in the use of various vibration modes. Moreover, a vibration motor having a quick response is required in a touch type mobile phone which is currently popular, making it difficult to satisfy the demands of consumers.

In order to solve this problem, Korean Patent No. 10-0735299 titled "Vertical Vibrator" and Korean Patent No. 10-0934584 titled "Linear Vibration Motor" have already suggested vibration devices which are operated upward and downward without using a brush. However, in such a linear vibration device having the structure, since a coil should move upward and downward between a magnet and a yoke, there is a need for sufficiently securing side gaps and the coil being continuously lifted and lowered with no limit in its movement due to a mutual force between the coil and the magnet. Accordingly, the coil may cause noise due to its mechanical contact with other components. Further, such a linear vibration device includes a damper and a magnetic fluid, which lower productivity and progress characteristics, making it difficult to find out a basic solution and secure productivity and reliability of a product.

The present invention relates to a linear vibration motor configured to solve the above problem, and maximizes productivity by improving contact noise and maintaining a gap on one side, wherein vibrations may be varied according to an electrical signal with a specific frequency, which is input from the outside, and a vibrating body may be stopped in a magnetic circuit fashion during an upward and downward movement thereof.

SUMMARY OF THE INVENTION

Accordingly, the present invention has been made to solve the above-mentioned problems occurring in the prior art, and the present invention provides a linear vibration device which does not employ a brush or a rectifier to make its life semi-permanent.

The present invention also provides a linear vibration motor which secures a reliability of a product by maintaining a gap on one side between a coil and a magnet and stops an upward and downward operation in a magnetic circuit fashion, making it possible to prevent mechanical contact, improve contact noise, secure a magnetically stable operation, and realize a quick response speed.

In order to accomplish this object, there is provided a linear vibration device in which a PCB is coupled to a bracket having an extension piece protruding at a peripheral portion thereof to transfer an external electrical signal to a coil and a yoke of a stator is installed on an upper surface of the PCB to be coupled to the coil, in order to maximally generate an electromagnetic force in one direction.

In addition, an upper plate and a lower plate are configured to concentrate a magnetic field of a magnet configured to create a magnetic field corresponding to an electromagnetic force of the yoke formed by the coil to one direction. Accordingly, a vibrating body includes a vibrator which is operated upward and downward in response to an electromagnetic force concentrated by the yoke, increasing vibration feelings due to the upward and downward movement thereof.

Further, after a resilient body is coupled to the vibrating body to send a vibration sound to the outside and is fixed to an inner surface of a hollow case of a cover, the vibrating body is coupled to the bracket having the extension piece to completely finish the linear vibration device.

The above-structured linear vibration device according to the present invention includes a magnet for generating a magnetic field, and upper and lower plates configured to concentrate a magnetic force of the magnet to one direction. A vibrating body is operated upward and downward by an electromagnetic force and attractive and repulsive forces of a yoke concentrated to a coil according to an electrical signal. A vibration sound caused by the upward and downward movement of the vibrating body is transferred to the outside through a hollow case, vibrating electronic devices.

The upward and downward movement of the vibrating body is limited by magnetic forces of the yoke and the upper and lower plates, making it possible to secure a stable operation. A gap can be secured so as not to cause a contact on the upper and lower sides, so only one gap may be managed between the coil and the magnet, making it possible to enhance productivity and durability.

As discussed above, the linear vibration device of the present invention does not employ a brush or a rectifier applied to a conventional vibration motor, so a life of the vibration motor can be made semi-permanent. Further, the vibrating body can be stopped magnetically during an upward and downward operation of the conventional linear vibration device, so the linear vibration motor of the present invention can be stably realized. Furthermore, only one gap is provided between the coil and the magnet, significantly enhancing productivity and durability and improving the reliability of a product.

BRIEF DESCRIPTION OF THE DRAWINGS

The above and other objects, features and advantages of the present invention will be more apparent from the following detailed description taken in conjunction with the accompanying drawings, in which:

FIG. 2 is a sectional view of the linear vibration device according to the present invention;

FIG. 3 is a sectional view of a conventional linear vibration motor;

FIG. 8 is a sectional view of a conventional vibration motor employing a brush and a rectifier.

FIG. 9 is a sectional view of the linear vibration device according to the another embodiment of present invention;

DETAILED DESCRIPTION OF THE PREFERRED EMBODIMENTS

Hereinafter, exemplary embodiments of the present invention will be described in detail with reference to the accompanying drawings.

Figure 1:
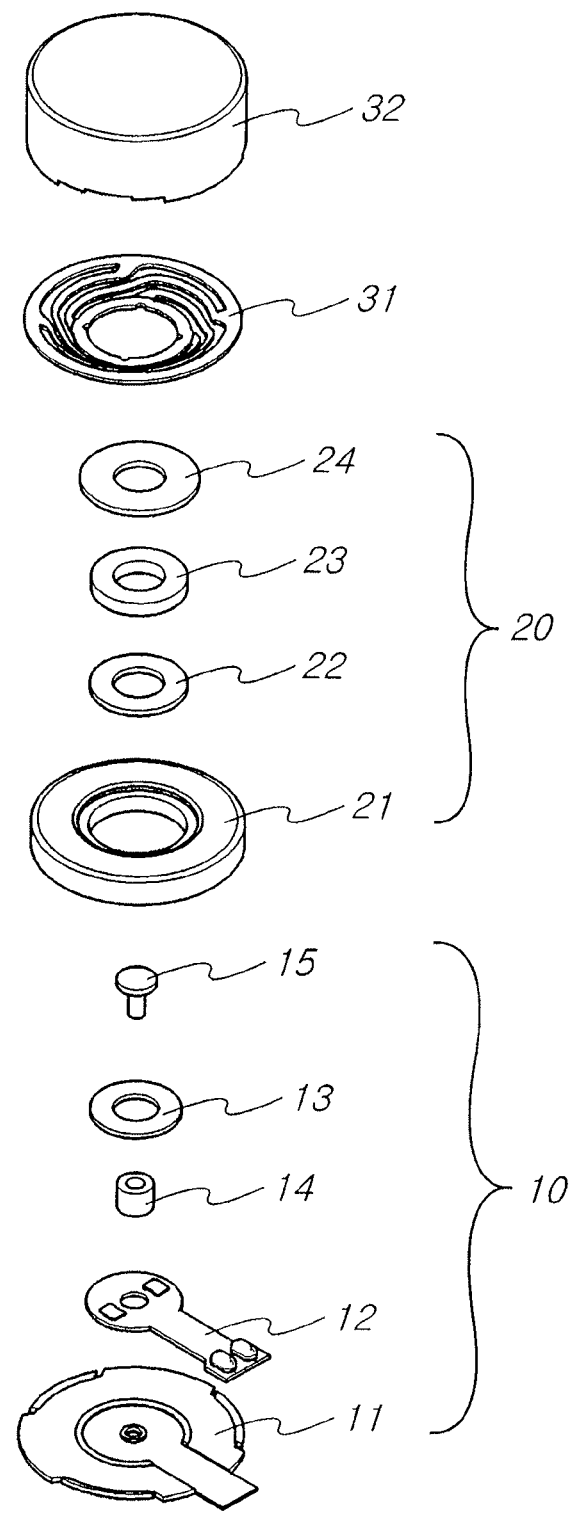
FIG. 1 is an exploded perspective of a linear vibration device according to the present invention.

As illustrated in FIG. 1, a linear vibration motor according to the present invention includes a vibrating body 20 having a magnet 23 creating a permanent magnetic field, lower and upper plates 22 and 24 installed to concentrate a direction of a magnetic force of the magnet 23 to a specific direction respectively, and a vibrator 21 coupled to the upper plate 24 and configured to increase a magnitude of vibrations, the vibrating body 20 being finally assembled with the vibrator 21.

In this case, the vibrator 21 assembled in the vibrating body 20 preferably has a density generally heavier than that of iron. The linear vibrator motor includes a resilient body 31 coupled to an upper surface of the upper plate 24 to effectively transfer a vibration sound of the vibrating body 20 to the outside and configured to help the vibrating body 20 move upward and downward along a specific direction, and a hollow case 32 coupled to the resilient body 31 to transfer a vibration sound to the outside.

The resilient body 31 connected to the vibration body 20 has a starting point coupled to the upper plate 24 and an ending point coupled to the case 32 so that the vibration body 20 can be minimally shaken when the vibration body is operated upward and downward. A center of the resilient body 31 is preferably empty, and the upper plate 24 is preferably larger than the lower plate 22 to make it easy to couple the vibrator 21.

The linear vibration motor includes a stator 10 installed on a lower surface of the vibrating body 20 and having a coil 14 for generating an electromagnetic force, a yoke 15 configured to concentrate a magnetic force generated by the coil 14 to one direction to maximize the magnetic force while the yoke 15 is inserted into the coil 14, a PCB (Printed Circuit Board) 12 for transferring an electric signal with a specific frequency which is received from the outside, and a bracket 11 having an extension piece protruding at a peripheral portion of the hollow case 32.

In this case, the yoke 15 used to maximize a magnetic force generated by the coil 14 should have an outer diameter smaller than an inner diameter of the coil 14 so that it can be inserted into the coil 14. A circumferential boss 15A is preferably formed in one axis direction such that an electromagnetic force concentrated by the coil 14 corresponds to a magnetic force line created by the upper plate 24 and the lower plate 22. The PCB 12 is coupled to a marginal line of the coil 14 by soldering or welding. A protective plate 13 is preferably installed to protect a soldered or welded portion of the coil 14 when the vibration body 20 is operated upward and downward to transfer an external electric signal to the coil 14.

The coil 14 preferably has an annular shape, and an inner diameter of the magnet 23 is preferably larger than an outer diameter of the coil 14 so that the magnet 23 can be inserted into the coil 14.

FIG. 2 illustrates an assembled state of the linear vibration motor including the above-mentioned components.

FIG. 3 illustrates a conventional linear vibration motor. With an assumption that an S pole and an N pole are created in a yoke 84 and a plate 83 respectively by a magnetic force of the magnet 82 to form a magnetic circuit in one direction and an N pole is created on the upper side of the coil 87 by an electric signal +A, a vibrating body 80 is moved to the lower side by Fleming's left-hand law and the vibrating body 80 is apt to continuously move downward while an electric signal +A is applied, colliding with a bracket 88. On the other hand, if an electric signal −A is applied to a coil, an S pole is created on the upper side of the coil 87. Then, the vibrating body 80 is moved upward, and is apt to continuously move upward while an electric signal −A is applied, colliding with a case 81 or a resilient body 86 and generating mechanical contact noise.

Figure 4:
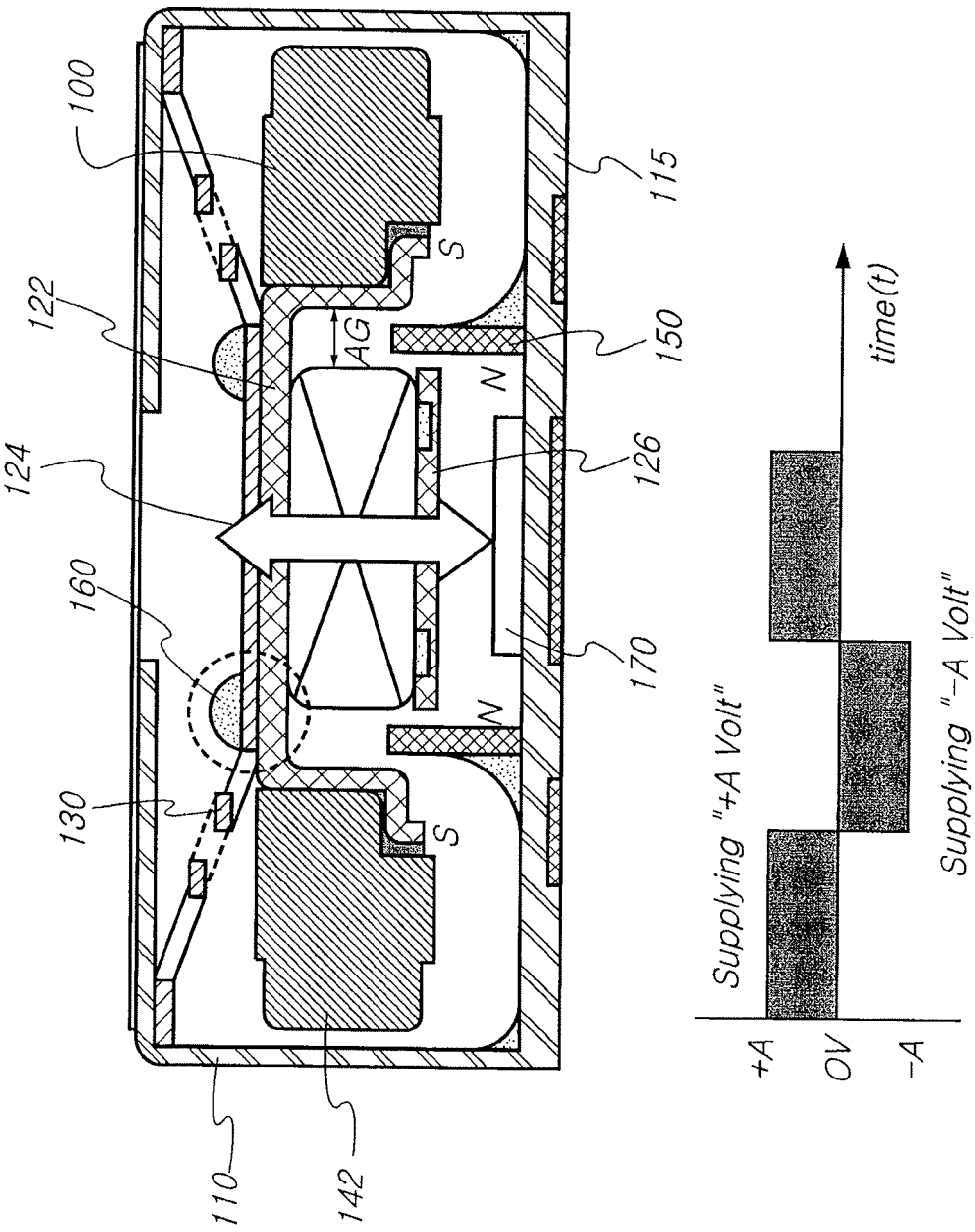
FIG. 4 is a sectional view of an improvement of the conventional linear vibration motor.

FIG. 4 illustrates an example of using a damper 170 and a magnetic fluid 160 on the lower and upper sides respectively to overcome contact noise of the conventional linear vibration motor. In this example, the vibrating body 100 will move downward by an electric signal +A, colliding with a bracket 115. Although a damper 170 made of an impact absorbing material is installed on the lower side in order to prevent this phenomenon, a mechanical impact due to an operation of the vibrating body cannot be avoided or absorbed by 100 percent. Thus, a mechanical impact sound of the vibrating body 100 is transferred to the damper 170, causing mechanical noise. The mechanical noise is amplified together with a resonance frequency of a product coupled to a mobile phone and an electronic device while amplifying various high-frequency noises, which cause vibration problems. Thus, consumers may feel discomfort and defective products may be generated in a production line.

On the other hand, the vibrating body 100 will move upward by an electric signal −A, colliding with a case 110 or a resilient body 130. Although a magnetic fluid 160 acting as a magnetic body is used to prevent the collision, a magnitude of an impact of the vibrating body 100 is varied according to an amount of the magnetic fluid 160. If the amount of the magnetic fluid 160 is increased in order to overcome this problem, an upward/downward operation of the vibrating body 100 is restricted, resulting in a rapid reduction in a magnitude of vibrations and difficulty in management of the magnitude of vibrations. Even when the magnitude of the vibrations is controlled to a proper degree, as a mobile phone employing the linear vibration motor is carried and used in various environments and at different locations, it cannot maintain the proper magnitude of the vibrations for the initial characteristics, causing progress noise and deterioration of the characteristics.

Figure 5:
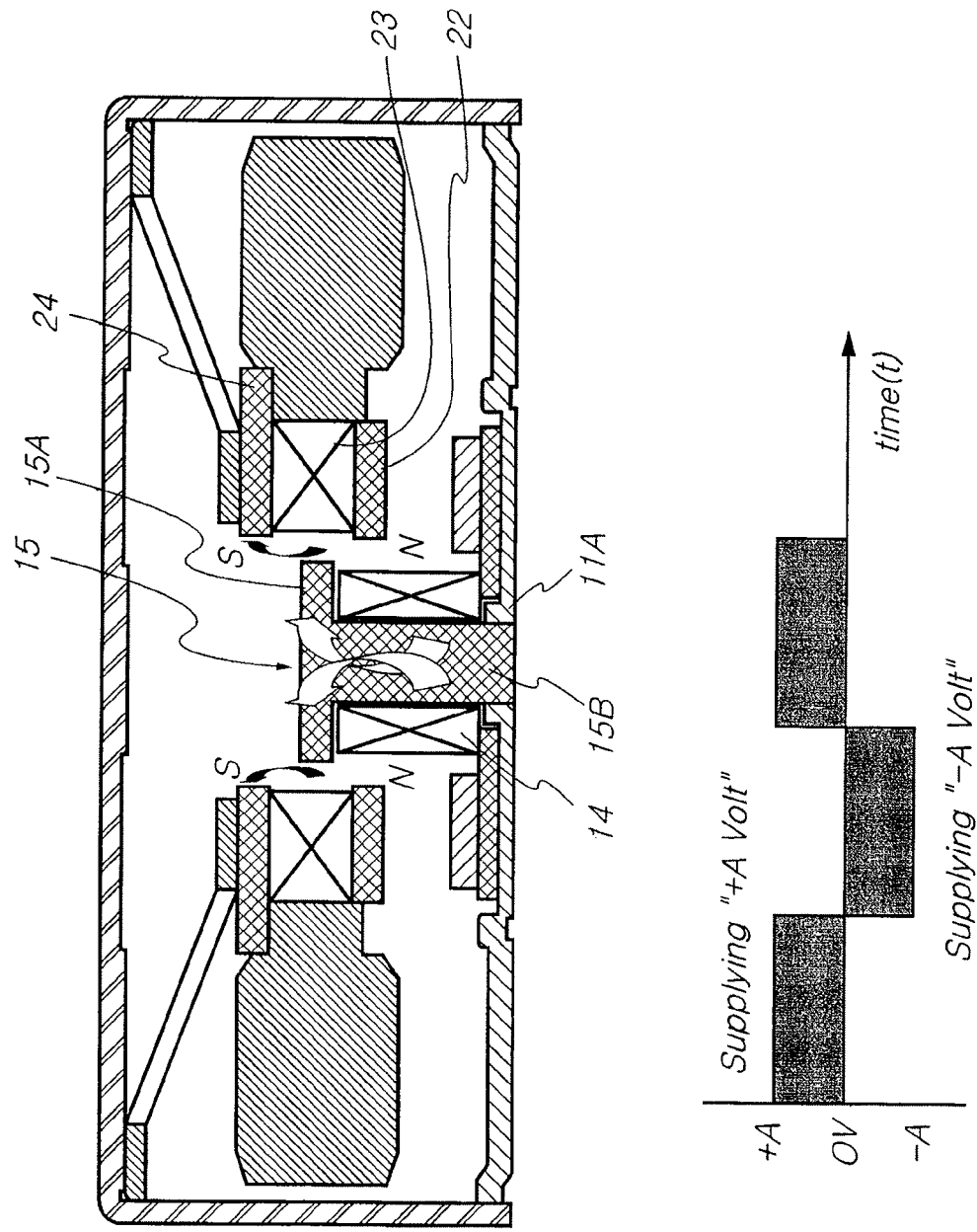
FIG. 5 is a sectional view illustrating a magnetic field created according to the present invention.

FIG. 5 illustrates a magnetic circuit for overcoming the problems of the conventional liner vibration motor. A magnetic force of the magnet 23 generates a magnetic force line flowing in one direction by the upper plate 24 and the lower plate 22. An electromagnetic force by the coil 14 gathers through the centrally located yoke 15 and then gathers at and emits from the circumferential boss 15A of the yoke 15. The vibrating body 20 is operated upward and downward by attractive and repulsive forces between the magnetic force which has gathered in the upper plate 24 and the lower plate 22 and the electromagnetic force generated in the circumferential boss 15A of the yoke by AC power. The bracket 11 has desirably a central boss hole 11A at a central portion thereof which meets a lower circumferential portion 15B of the yoke 15 to fix the yoke 15.

Figure 6:
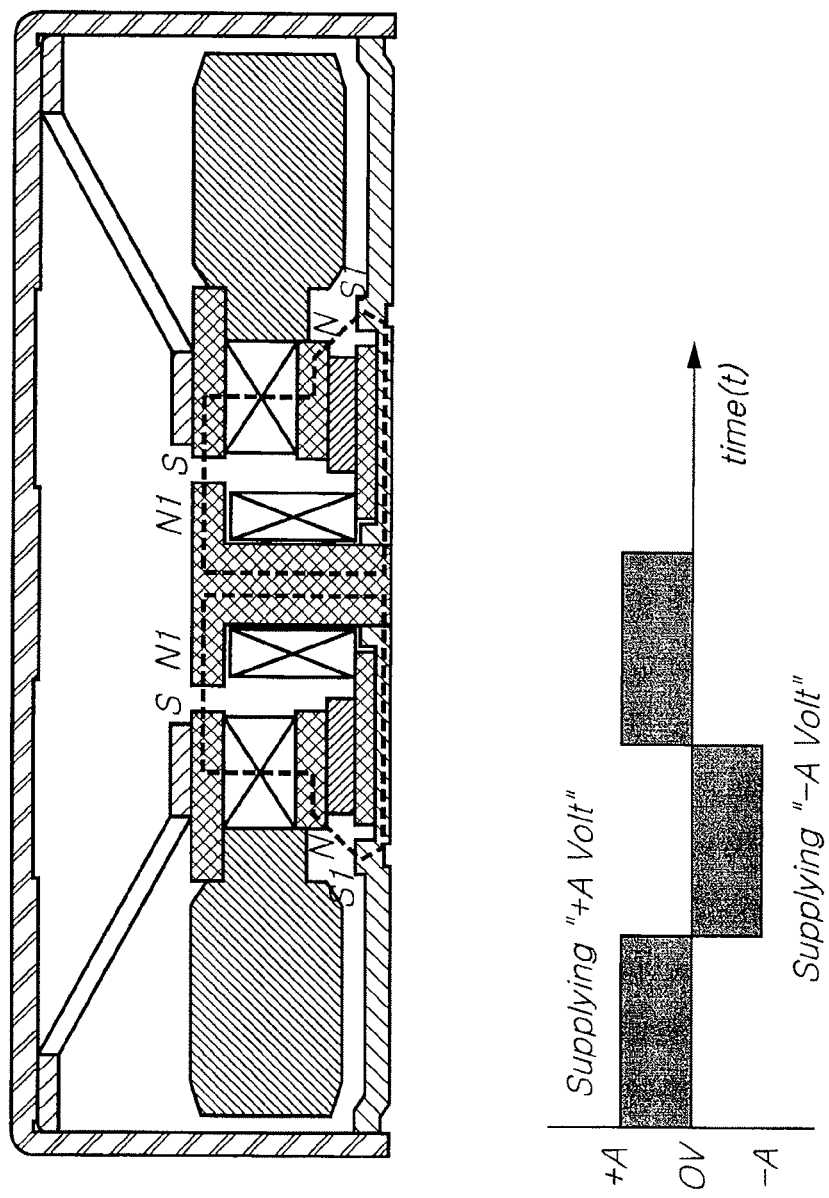
FIG. 6 is a sectional view illustrating a lower fixing magnetic field according to the present invention.

FIG. 6 is a sectional view illustrating a lower fixing magnetic field according to the present invention. The permanent magnetic field generated by the magnet 23 of the vibrating body 20 creates an S pole on one side of the upper plate 24 and an N pole in the lower plate 22. An electromagnetic force is generated in the coil 14 by an electric signal +A with a specific frequency which is input from the outside. The electromagnetic force generated in the coil 14 creates an N pole concentrated on one side of the yoke 15. A repulsive force is generated in the lower plate 22 and an attractive force is generated in the upper plate 24. Then, the vibrating body 20 rapidly moves to the lower side and then reaches a magnetically stable position. The vibrating body 20 remains stopped even when an electric signal +A is continuously applied. Accordingly, the vibrating body 20 can be stopped at a magnetically stable position while maintaining a stable operation.

Figure 7:
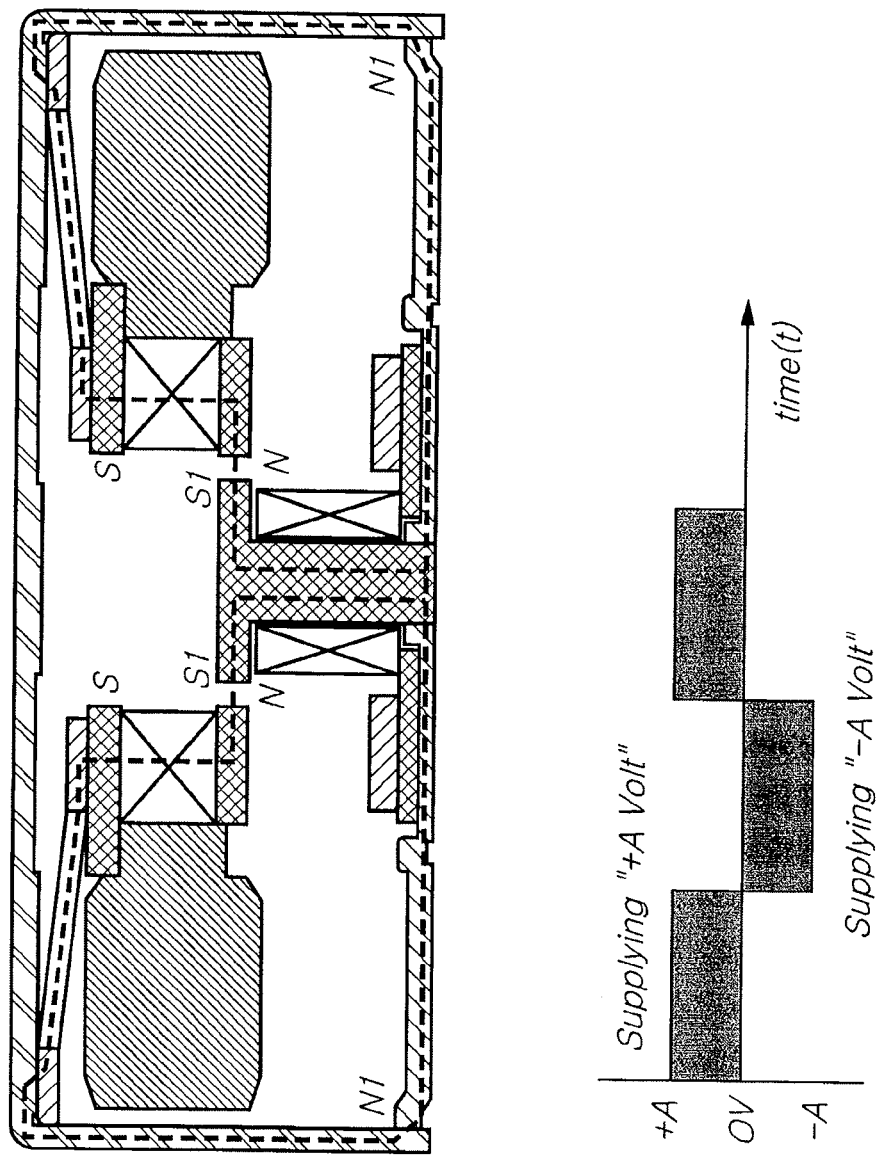
FIG. 7 is a sectional view illustrating an upper fixing magnetic field.

FIG. 7 is a sectional view illustrating an upper fixing magnetic field according to the present invention. The permanent magnetic field generated by the magnet 23 of the vibrating body 20 creates an S pole on one side of the upper plate 24 and an N pole in the lower plate 22. An opposite electromagnetic force is generated in the coil 14 by an electric signal −A with a specific frequency which is input from the outside. The electromagnetic force generated in the coil 14 creates an S pole concentrated on one side of the yoke 15. A repulsive force is generated in the upper plate 24 and an attractive force is generated in the lower plate 22. Then, the vibrating body 20 rapidly moves to the upper side and then reaches a magnetically stable position. The vibrating body 20 remains stopped even when an electric signal −A is continuously applied. Accordingly, the vibrating body 20 can be stopped at a magnetically stable position while maintaining a stable operation.

Accordingly, if a sine wave close to the spherical waves of electrical signals +A and −A is alternately applied to the coil 14 rapidly, the yoke concentrates an alternate magnetic field to the circumferential boss 15A. Then, the vibrating body 20 is moved upward and downward, so a vibration sound caused by the moved vibrating body 20 is transferred to the case of the hollow case through the resilient body 31.

FIG. 8 is a sectional view illustrating a conventional vibration motor employing a brush 105 and a rectifier 111.

As mentioned above, since the liner vibration device according to the present invention does not employ a brush 105 or a rectifier 111 applied to the conventional vibration motor, a life of the vibration motor can be semi-permanent. Further, the present invention employs the magnetic fluid 160 and the damper 170 to prevent contact noise from being generated between the vibrating body 80 and 100, the case 81 and 110, and the bracket 88 and 115 due to the upward and downward movement of the vibrating body. In order to prevent mechanical vibration and progressive vibration characteristics from being degraded, the vibrating body can be stably stopped using attractive and repulsive forces of the yoke 15 which maximizes a magnetic force of the coil 14 using the upper plate 24 and the lower plate 22, making it possible to effectively stabilize operation characteristics and secure a quick response speed.

FIG. 9 is a sectional view of the linear vibration device according to the another embodiment of present invention; In this embodiment, the resilient body 31 can be provided as a coupled member with the bracket 11 to assemble easily for the worker.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A linear vibration device comprising:
   a vibrating body comprising:
      a magnet configured to create a magnetic field,
      upper and lower plates installed to concentrate a direction of a magnetic force of the magnet to a specific direction, and
      a vibrator coupled to the upper plate and configured to increase a magnitude of vibrations;
   a resilient body coupled to an upper surface of the upper plate to transfer a vibration sound of the vibrating body to the outside of the linear vibration device, and configured to permit the vibrating body to move upward and downward;
   a hollow case coupled to the resilient body to transfer the vibration sound to the outside of the linear vibration device; and
   a stator installed on a lower surface of the vibrating body, and the stator comprising:
      a yoke configured to concentrate an electromagnetic force to a direction,
      a coil coupled to the yoke to generate the electromagnetic force,
      a printed circuit board (PCB) coupled to the coil to transfer an electric signal with a specific frequency which is received from the outside of the linear vibration device, and
      a bracket coupled to the PCB and having an extension piece protruding at a peripheral portion of the bracket,
   wherein the yoke includes:
      a head portion with a diameter larger than an outer diameter of the coil, and
      a pillar portion with a diameter smaller than an inner diameter of the coil.

2. The linear vibration device as claimed in claim 1, wherein the magnet include a hollow portion in which the head portion of the yoke is inserted.

3. The linear vibration device as claimed in claim 1, wherein the vibrator coupled to the vibrating body has a density heavier than the density of iron.

4. The linear vibration device as claimed in claim 1, wherein one end point of the resilient body connected to the vibrating body is coupled to the upper plate and the other end point of the resilient body is coupled to the case whereby the resilient body is restrained from being shaken during an operation of the vibrating body, and wherein the resilient body includes a hollow portion in the center of the resilient body.

5. The linear vibration device as claimed in claim 1, wherein
   the PCB and marginal lines of the coil are coupled by soldering or welding to transfer the electrical signal to the coil, and
   the device further comprises a protective plate configured to protect a soldered or welded portion of the coil during a downward movement of the vibrating body.

6. A linear vibration device comprising:
   a vibrating body having a magnet creating a permanent magnetic field, a lower plate installed to concentrate a direction of a magnetic force of the magnet to a specific direction, and an upper plate installed to concentrate a direction of a magnetic force of the magnet to a specific direction, and a vibrator coupled to the upper plate and configured to increase a magnitude of vibrations, the vibrating body being finally assembled with the vibrator;
   a resilient body coupled to an upper surface of the upper plate to effectively transfer a vibration sound of the vibrating body to the outside and configured to help the vibrating body move upward and downward along a specific direction;

a hollow case coupled to the resilient body to transfer a vibration sound to the outside; and a stator installed on a lower surface of the vibrating body, and having a yoke configured to concentrate an electromagnetic force to one direction, a coil coupled to the yoke to generate an electromagnetic force, a PCB coupled to the coil to transfer an electric signal with a specific frequency which is received from the outside, and a bracket coupled to the PCB and having an extension piece protruding at a peripheral portion thereof, the stator being finally assembled with the bracket, and the case being finally coupled to the stator, wherein the yoke has an outer diameter smaller than an inner diameter of the coil to concentrate an electromagnetic force of the coil and maintain stable magnetic characteristics, and having a circumferential boss at an upper portion whose outer diameter is larger than an outer diameter of the coil so that an electromagnetic force concentrated by the coil corresponds to a magnetic force line created by the upper plate and the lower plate.

7. The linear vibration device as claimed in claim 6, wherein the bracket has a central boss hole at a central portion thereof which meets a lower circumferential portion of the yoke to fix the yoke.

8. A linear vibration device comprising:

a vibrating body having a magnet creating a permanent magnetic field, a lower plate installed to concentrate a direction of a magnetic force of the magnet to a specific direction, and an upper plate installed to concentrate a direction of a magnetic force of the magnet to a specific direction, and a vibrator coupled to the upper plate and configured to increase a magnitude of vibrations, the vibrating body being finally assembled with the vibrator;

a resilient body coupled to an upper surface of the upper plate to effectively transfer a vibration sound of the vibrating body to the outside and configured to help the vibrating body move upward and downward along a specific direction;

a hollow case coupled to the resilient body to transfer a vibration sound to the outside; and a stator installed on a lower surface of the vibrating body, and having a yoke configured to concentrate an electromagnetic force to one direction, a coil coupled to the yoke to generate an electromagnetic force, a PCB coupled to the coil to transfer an electric signal with a specific frequency which is received from the outside, and a bracket coupled to the PCB and having an extension piece protruding at a peripheral portion thereof, the stator being finally assembled with the bracket, and the case being finally coupled to the stator, wherein the magnet has an annular shape having an inner diameter larger than an outer diameter of the yoke to correspond to an electromagnetic force concentrated in the yoke, and, wherein the upper plate and the lower plate have an annular shape the same as the annular shape of the magnet on an upper surface and a lower surface thereof respectively to convert a magnetic force of the magnet to one direction of the magnetic field.

9. The linear vibration device as claimed in claim 8, wherein an outer diameter of the upper plate is made larger than an outer diameter of the lower plate.

* * * * *